United States Patent
Takeda

(10) Patent No.: US 8,170,205 B2
(45) Date of Patent: May 1, 2012

(54) PROCESSOR APPARATUS

(75) Inventor: Koichi Takeda, Hachiouji (JP)

(73) Assignee: Lapis Semiconductor Co., Ltd. (JP)

( * ) Notice: Subject to any disclaimer, the term of this patent is extended or adjusted under 35 U.S.C. 154(b) by 682 days.

(21) Appl. No.: 12/331,587

(22) Filed: Dec. 10, 2008

(65) Prior Publication Data

US 2009/0172415 A1  Jul. 2, 2009

(30) Foreign Application Priority Data

Dec. 28, 2007  (JP) .................................. 2007-339040

(51) Int. Cl.
 *H04K 1/04* (2006.01)
 *H04N 7/167* (2011.01)
 *H04L 9/00* (2006.01)
 *G06F 11/30* (2006.01)
(52) U.S. Cl. ........... 380/37; 380/239; 380/259; 713/193
(58) Field of Classification Search .................. 713/190, 713/193; 380/37, 239, 259
 See application file for complete search history.

(56) References Cited

U.S. PATENT DOCUMENTS

| 5,987,572 | A  | * | 11/1999 | Weidner et al. | ............... | 711/155 |
| 2007/0067644 | A1 | * | 3/2007 | Flynn et al. | .................... | 713/189 |
| 2008/0005590 | A1 | * | 1/2008 | Kasahara et al. | ............. | 713/193 |
| 2008/0301467 | A1 | * | 12/2008 | Saito | ............................ | 713/190 |

FOREIGN PATENT DOCUMENTS

| JP | 2001-230770 | 8/2001 |
| JP | 2006-179029 | 7/2006 |

* cited by examiner

*Primary Examiner* — Mohammad Reza
(74) *Attorney, Agent, or Firm* — Studebaker & Brackett PC; Donald R. Studebaker

(57) ABSTRACT

The control unit includes a CPU which generates an access signal for performing writing or reading on the external memory, encryption/decryption means which, when the access signal is used for writing, encrypts an address designated by the CPU to generate a write address and encrypts write data contained in the access signal to generate write encrypted data, and which, when the access signal is used for reading, encrypts an address designated by the CPU to generate a read address and decrypts the encrypted data read from the external memory to generate plaintext data, and external control means which writes the write encrypted data in a position designated by the write address generated by the encryption/decryption means and which reads the encrypted data from a position designated by the read address generated by the encryption/decryption means and supplies the same to the encryption/decryption means for its decryption.

6 Claims, 6 Drawing Sheets

FIG. 5
(a)
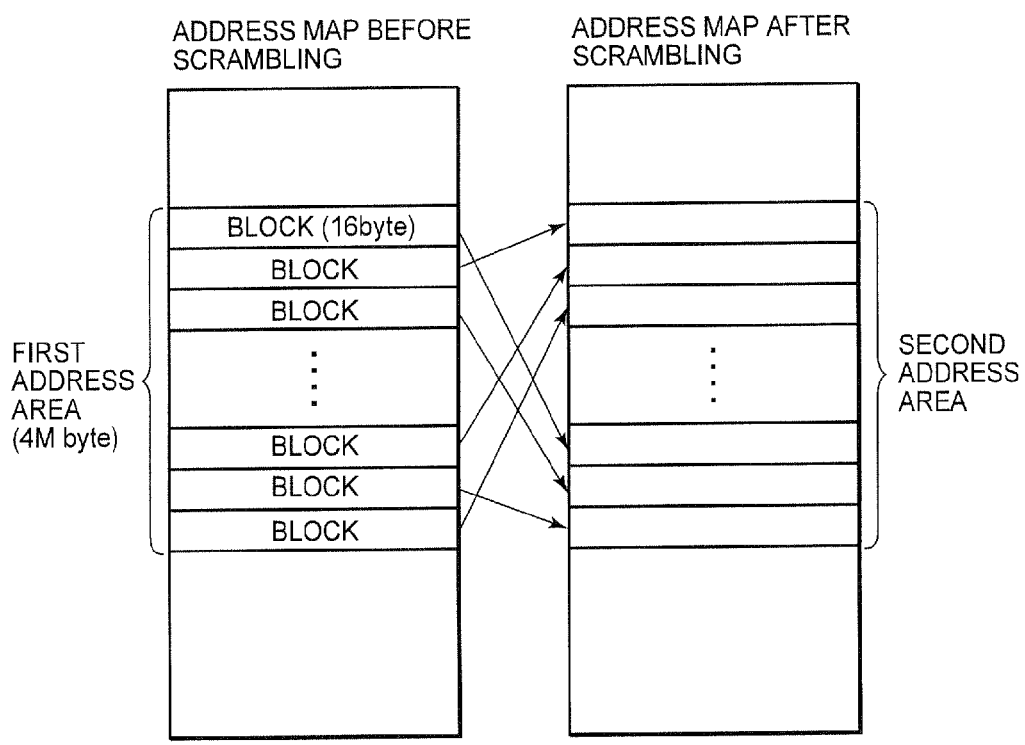
(b)
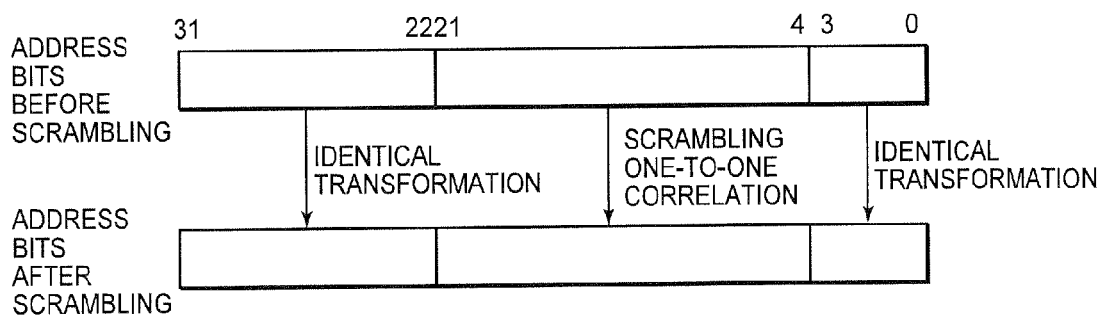

PROCESSOR APPARATUS

BACKGROUND OF THE INVENTION

The present invention relates to a processor apparatus equipped with a control unit such as an MCU (microcontroller) and an external memory externally connected thereto.

Since a built-in system using an MCU, which is large in scale, becomes large in program size over its entire system, a program and data cannot be stored in memories (ROM and RAM) lying inside the MCU, each comprising a single LSI (Large Scale Integration). Memories such as a flash ROM, an RAM and the like are connected to the outside of the MCU, and the program and data are frequently stored therein.

When the program and data are stored in the external memory in this way, there is a possibility that the reading, analysis and interpolation of the program and data by a third party will become easy because the external memory has no confidentiality as compared with a built-in memory.

On the other hand, a method for encrypting a program per se thereby to make it hard to perform an analysis that leads to program's falsification has been thought out to protect the program and data from their analyses and interpolation (refer to patent documents 1 (Japanese Unexamined Patent Publication No. 2001-230770) and 2 (Japanese Unexamined Patent Publication No. 2006-179029)). In such a method, for example, the encrypted program is stored in an external ROM and a decryption program stored in a built-in ROM whose confidentiality has been ensured is executed upon startup of the program thereby to decrypt the encrypted program lying in the external ROM, followed by being expanded to an external RAM. Thereafter, the program of the external RAM is executed to operate a system.

Such a method is however accompanied by problems that the external RAM enough to expand a program is required, thereby leading to an increase in the cost of the system, and further when address and data signals on a substrate are monitored upon program execution, program-contained data is easily available because the program expanded onto the external RAM has not been encrypted.

SUMMARY OF THE INVENTION

The present invention has been made in view of the forgoing. It is therefore an object of the present invention to provide a processor apparatus capable of preventing data such as a program from being easily obtained and analyzed even though the data is stored in an external memory of a control unit.

According to one aspect of the present invention, for attaining the above object, there is provided a processor apparatus comprising a control unit to which an external memory is connected, the processor apparatus writing data encrypted by the control unit in the external memory and reading the encrypted data therefrom, wherein the control unit includes a CPU which generates an access signal for performing writing or reading on the external memory, encryption/decryption means which when the access signal is used for writing, encrypts an address designated by the CPU to generate a write address and encrypts write data contained in the access signal to generate write encrypted data, and which when the access signal is used for reading, encrypts an address designated by the CPU to generate a read address and decrypts the encrypted data read from the external memory to generate plaintext data, and external control means which writes the write encrypted data in a position designated by the write address generated by the encryption/decryption means and which reads the encrypted data from a position designated by the read address generated by the encryption/decryption means and supplies the same to the encryption/decryption means for its decryption.

According to the processor apparatus of the present invention, when an access signal for writing of data to an external memory is generated, a designated address is encrypted by encryption/decryption means to generate a write address, and write data is encrypted to generate write encrypted data. The write encrypted data is written into a position of the external memory, which has been designated by the write address. When an access signal for reading of data from the external memory is generated, a designated address is encrypted by the encryption/decryption means to generate a read address, and encrypted data is read from a position of the external memory, which has been designated by the read address. The read encrypted data is brought to plaintext data by decryption of the encryption/decryption means. Thus, since the data and addresses are transmitted between the external memory and the control unit in an encrypted state, it is not possible to easily obtain data such as a program in a suitable state even though address and data signals are monitored. It is thus possible to prevent false reading by a third party and an analysis that leads to interpolation.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 5 is a diagram for describing an address scramble; and

DETAILED DESCRIPTION OF THE PREFERRED EMBODIMENTS

A preferred embodiment of the present invention will hereinafter be described in detail with reference to the accompanying drawings.

Figure 1:
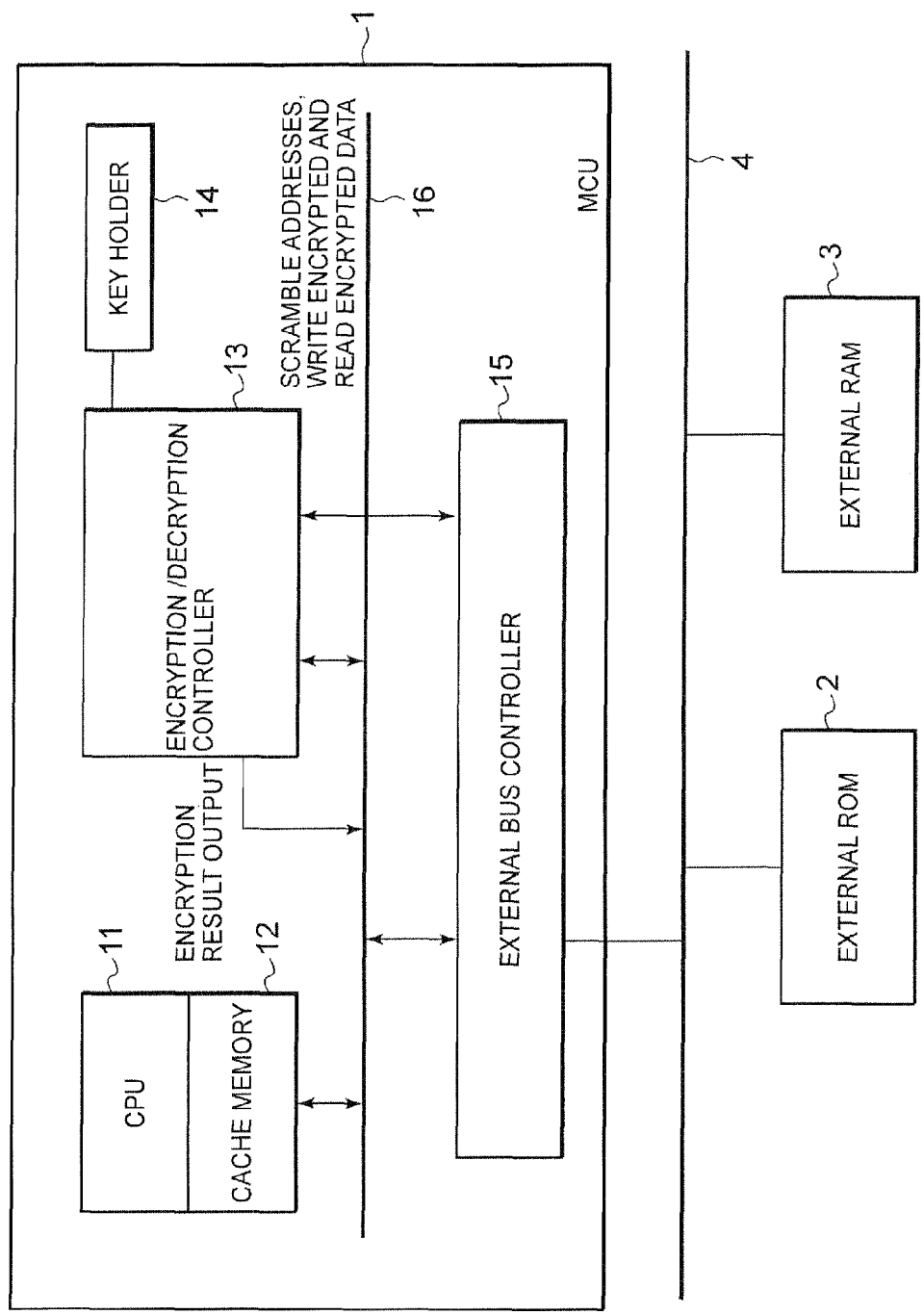
FIG. 1 is a block diagram showing an embodiment of the present invention.

FIG. 1 shows a processor apparatus used in a built-in system as a preferred embodiment of the present invention.

The processor apparatus includes an MCU unit 1 corresponding to a control unit, an external ROM 2, an external RAM 3 and an external bus 4. The external bus 4 is of a common bus for connecting the MCU unit 1, the external ROM 2 and the external RAM 3 to one another.

An encrypted program is stored in the external ROM 2. Encrypted data is stored in the external RAM 3.

The MCU unit 1 comprises an LSI and includes a CPU (central processing unit) 11, a cache memory 12, an encryption/decryption controller 13, a key holder 14, an external bus controller 15 and an internal bus 16. The internal bus 16 is of a common bus for connecting the cache memory 12, the encryption/decryption controller 13 and the external bus controller 15 to one another.

The cache memory 12 is provided as part of the CPU 11. The CPU 11 performs the input/output of programs and data via the cache memory 12. The cache memory 12 temporarily stores a program and data about each decrypted plaintext therein.

The external bus controller 15 is of external control means and relays and supplies data to be written into each address of the external ROM 2 or the external RAM 3, which has been designated by the CPU 11 or the encryption/decryption controller 13 or data to be read therefrom.

The encryption/decryption controller 13 constitutes encryption/decryption means together with the key holder 14 and performs an encryption/decryption process in block units using an address scramble and a key stored in the key holder 14 for every access to the external ROM 2 or the external RAM 3 corresponding to the external memory. A bus line for transmitting/receiving scramble addresses, write encrypted data and read encrypted data is provided between the encryption/decryption controller 13 and the external bus controller 15.

In the processor apparatus having such a configuration, the CPU 11 can obtain access to physical addresses of the external ROM 2 and the external RAM 3 at different address areas. That is, a first address area where the CPU 11 obtains access to the external ROM 2 or the external RAM 3 via the encryption/decryption controller 13, and a second address area where the CPU 11 directly obtains access to the external ROM 2 or the external RAM 3 without via the encryption/decryption controller 13, exist.

It is possible to select whether the CPU 11 is accessed via the encryption/description controller 13, depending on whether an address for an access destination at the time that the CPU 11 commands belongs to either one of the two address areas. Further, when the CPU 11 is accessed via the encryption/decryption controller 13, its operating state is set to an encryption result output mode, and its write access does not result in memory writing being not done via the external memory controller 15. Thus, the CPU 11 can read out the result of encryption and address scrambling of the encryption/decryption controller 13 from a specific address (encryption result output of encryption/decryption controller 13).

The CPU 11 generates access signals for instruction fetch, data read access, data write access and the like to execute each program.

Figure 2:
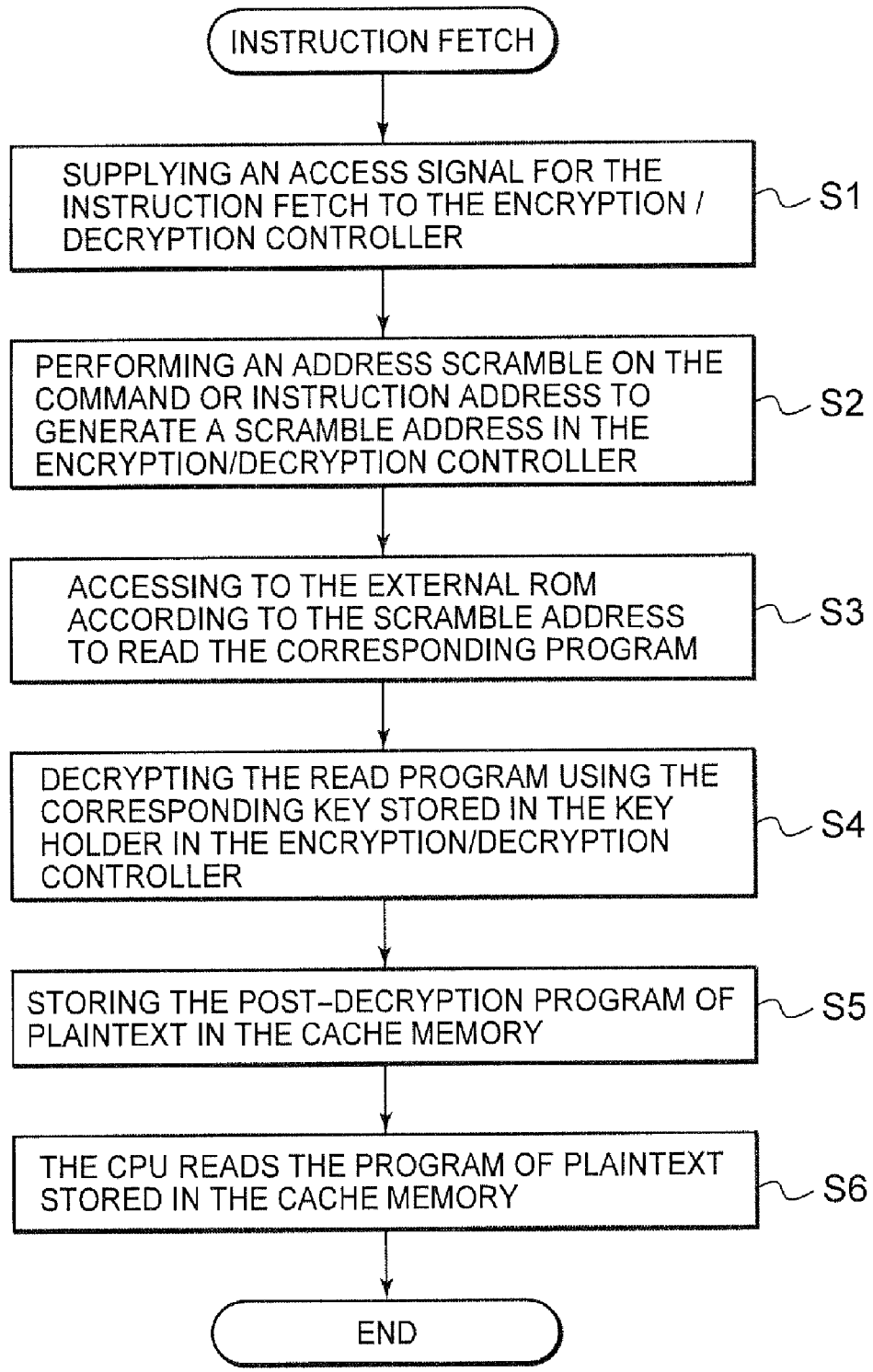
FIG. 2 is a flowchart illustrating an operation where an instruction fetch is performed on an external ROM in the system shown in FIG. 1.

When the CPU 11 performs an instruction fetch on the external ROM 2, the CPU 11 first supplies an access signal for the instruction fetch to the encryption/decryption controller 13 as shown in FIG. 2 (Step S1). The supply thereof to the encryption/decryption controller 13 is performed by an address instructed or designated by the CPU 11. That is, if the designated address corresponds to the first address area, then the access signal is supplied to the encryption/decryption controller 13 via the internal bus 16 along with the designated address. If, however, the designated address corresponds to the second address area other than the first address area, the access signal is supplied to the external ROM 2 or the external RAM 3 via the internal bus 16 and the external bus controller 15 without via the encryption/decryption controller 13. The designated address at Step S1 is contained in the first address area assigned to the encryption/decryption controller 13. When the address contained in the first address area is designated from the CPU 11 upon sending of the access signal for the instruction fetch or the like, the access signal is supplied to the encryption/decryption controller 13. The encryption/decryption controller 13 performs an address scramble (encryption) on the command or instruction address received from the CPU 11 to generate a scramble address for the external ROM 2 (Step S2). The scramble address obtained at Step S2 belongs to the second address area.

Next, the encryption/decryption controller 13 obtains access to the external ROM 2 according to the scramble address to read the corresponding program (Step S3). The encryption/decryption controller 13 decrypts the read program using the corresponding key stored in the key holder 14 (Step S4) and temporarily stores the post-decryption program of plaintext in the cache memory 12 (Step S5). The CPU 11 reads the program of plaintext stored in the cache memory 12 (Step S6).

Figure 3:
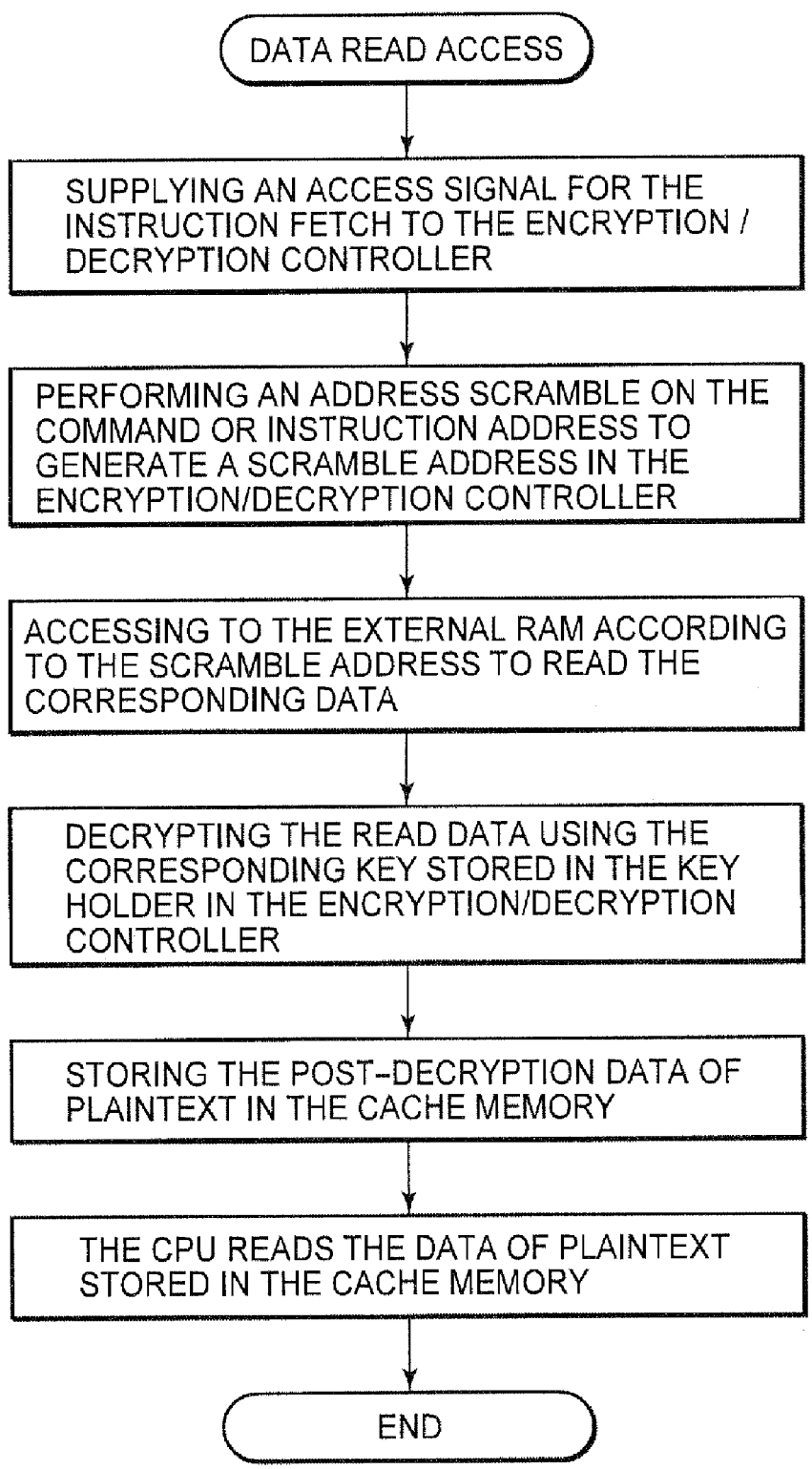
FIG. 3 is a flowchart depicting an operation where data read access is performed on an external RAM in the system shown in FIG. 1.

When the CPU 11 performs the data read access to the external RAM 3, the CPU 11 performs the reading of data in procedures similar to Steps S1 through S6 as shown in FIG. 3. This is similar even when the CPU 11 performs the data read access on the external ROM 2.

Figure 4:
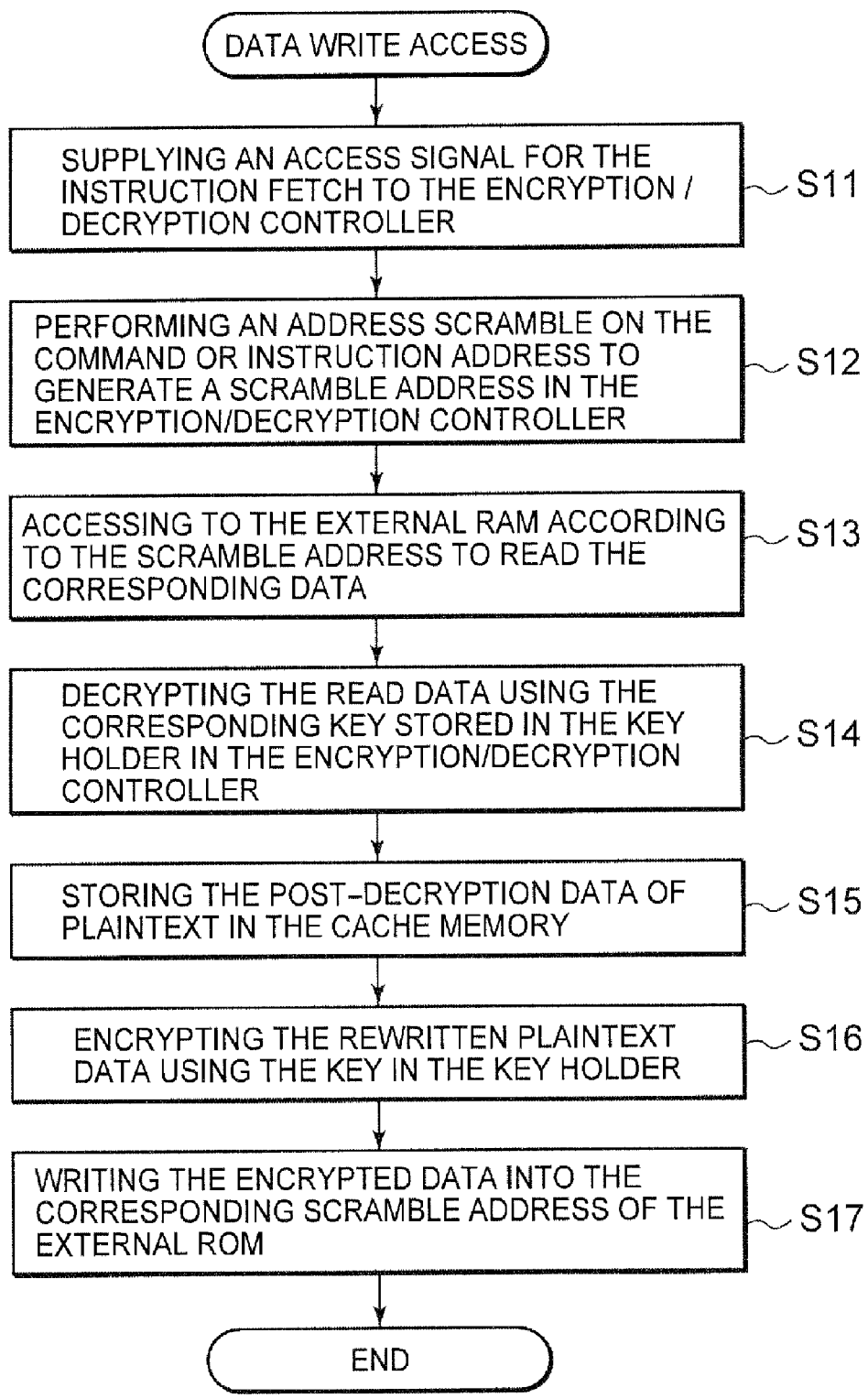
FIG. 4 is a flowchart showing an operation where data write access is performed on the external RAM in the system shown in FIG. 1.

When the CPU 11 performs the write access on the external RAM 3, the CPU 11 first supplies the access signal for the write access to the encryption/decryption controller 13 according to a designated address corresponding to the write address of the external RAM 3 as shown in FIG. 4 (Step S11). The command address at Step S11 is contained in the first address area. The encryption/decryption controller 11 performs an address scramble on the designated address received from the CPU 11 thereby to generate a scramble address for the external memory (Step S12). Next, the CPU 11 obtains access to the external RAM 3 according to the scramble address to read data about a block containing the corresponding address (Step S13). The read data is decrypted (Step S14) and the decrypted plaintext data is temperately stored in the cache memory 12 (Step S15). The CPU 11 rewrites the plaintext data. The encryption/decryption controller 13 encrypts the rewritten plaintext data with a predetermined timing using the key stored in the key holder 14 (Step S16) and writes the encrypted data into the corresponding scramble address of the external RAM 3.

Thus, since the data and addresses are transmitted between the external memories 2 and 3 and the external bus controller 15 in the encrypted state, it is not possible to easily obtain the data such as the program in a suitable state even though the address and data signals are monitored. It is thus possible to prevent false reading by a third party and an analysis that leads to interpolation.

As to the encryption of Step S16 by the encryption/decryption controller 13, program/data of a plaintext corresponding to one block is XORed with a leading address of its block, and ECB mode encryption of block ciphers is executed on the result of XORing. As to the decryption of Step S14, ECB mode decryption of block chippers is performed on one block of the encrypted program/data and the result thereof is XORed with a leading address of its block thereby to obtain the corresponding plaintext program/data.

As to the address scramble at Steps S2 and S12, each of the addresses outputted from the CPU 11 is converted to another address in block units for encryption/decryption, for example, 16-byte units. There also exists a scrambled range. Scrambling is conducted within a range of 4 M bytes, for example. The addresses subsequent to the scramble are not superimposed on one another, and the addresses (designated address referred to above) prior to the scramble and the addresses subsequent to the scramble are placed in a predetermined one-to-one correlation as shown in FIG. 5(*a*). The scrambling is performed in a range of 4 to 21 bits as shown in FIG. 5(b) by way of example between the addresses prior to the scramble and the addresses subsequent to the scramble. The contents are maintained as they are in the case of bits other than those. With the scrambled range as one unit, the scramble may be done in cascade form within a larger scramble range.

Incidentally, when the write access lies astride between the blocks, it is divided in block units before encryption, and encryption/decryption and memory writing are performed on the respective blocks.

The encryption/decryption and the address scramble are not performed in the second address area of a command address range from the CPU 11, which performs a bypass without using the encryption/decryption controller 13.

Adopting such an encrypting method needs not to encrypt program/data in order from the head and makes it possible to perform encryption processing in free order in block units.

A method for encrypting and address scrambling data containing programs and writing the same into the external ROM 2 will next be explained. Here, the external ROM 2 is a flash ROM of a non-volatile memory.

When data is written into the external ROM 2, the CPU 11 needs to send a write command, a write address and write data to the external ROM 2 and confirm whether its writing has been completed.

When the CPU 11 performs write access on the external ROM 2, the first address area for using the encryption/decryption controller 13 and the second address area for providing direct addressing from the CPU 11 to the external ROM 2 without using the encryption/decryption controller 13 are selectively used.

Figure 6:
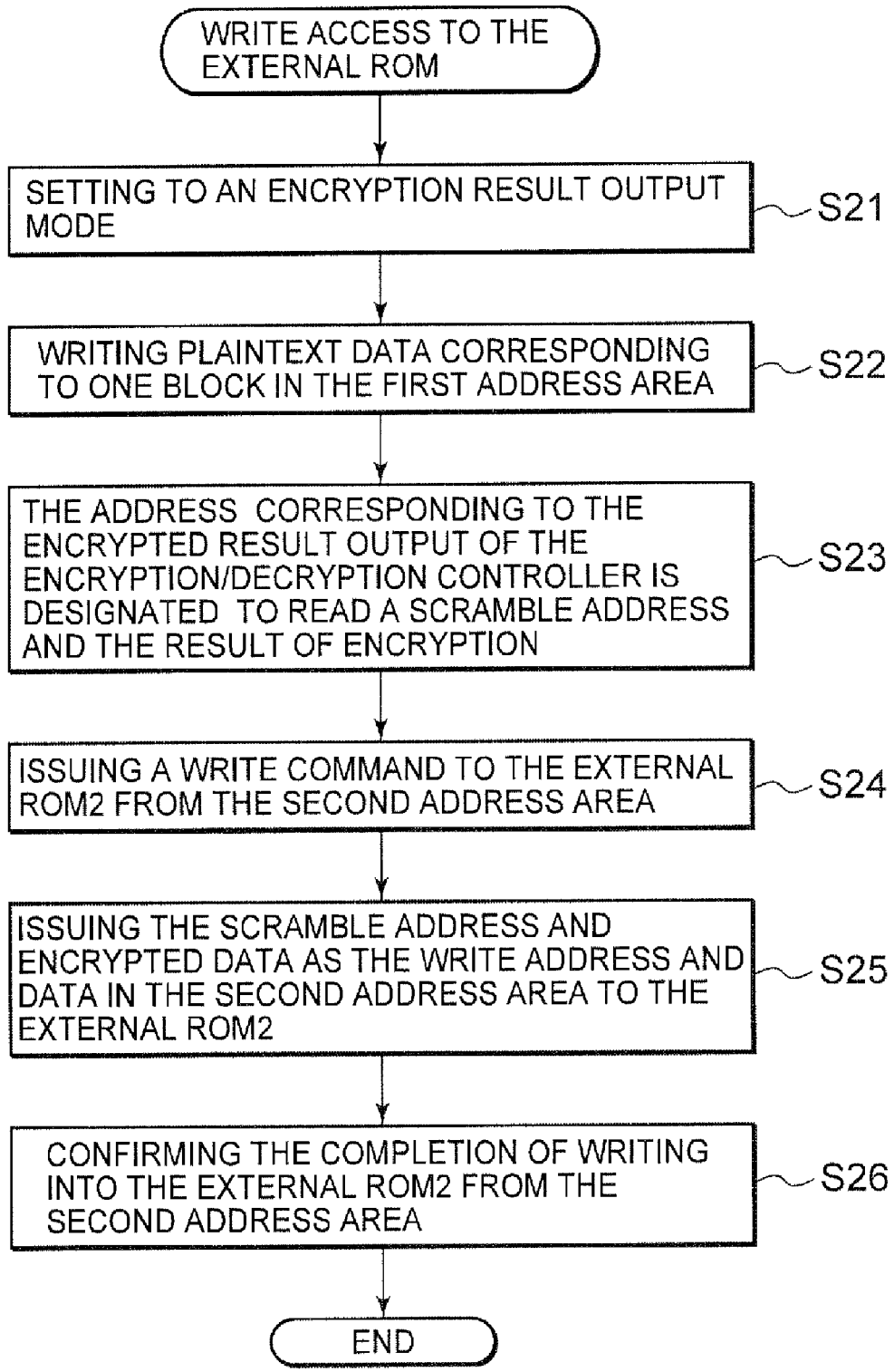
FIG. 6 is a flowchart showing an operation where data write access is performed on an external ROM comprising a flash ROM in the system shown in FIG. 1.

As shown in FIG. 6, the CPU 11 first performs a setting to an encryption result output mode using an address area (first address area) at which an access signal to the external memory passes through the encryption/decryption controller 13 (Step S21). The encryption result output mode is of a mode in which the CPU 11 obtains the result of scrambling of each address by the encryption/decryption controller 13 and encryption of data thereby without outputting the result to the external bus controller.

Next, plaintext data corresponding to one block is written in the first address area that passes through the encryption/decryption controller 13 (Step S22). At this time, data desired to be written is written into its corresponding address desired to be written in the external ROM 2. Thus, the address corresponding to the encrypted result output of the encryption/decryption controller 13 is designated to read a scramble address and the result of encryption (Step S23). The so-obtained scramble address is of an address in the second address area.

The CPU 11 issues a write command to the external ROM 2 from the second address area that bypasses the encryption/decryption controller 13 (Step S24). Thus, the write command to the external ROM 2 is issued as a command to the external ROM 2 via the external bus controller 15 without being encrypted and address-scrambled by the encryption/decryption controller 13. Subsequently, the scramble address and encrypted data obtained as above are issued as the write address and data in the second address area to the external ROM 2 (Step S25). The encrypted data corresponding to one block is written into its corresponding position designated by the scramble address of the external ROM 2 according to Step S25.

Finally, the completion of writing into the external ROM 2 is confirmed from the second address area that bypasses the encryption/decryption controller 13 (Step S26).

It is possible to write the encrypted and address-scrambled program and data into the external ROM 2 by repeating the above. Thus, since the data containing the program stored in the external ROM 2 can be encrypted by keys different every device where the data is updated due to version upgrading or the like of each program, encrypted data different every device are stored. Consequently, an advantage is brought about in that the encrypted data cannot be used in other devices even though it is read falsely. The safety of data protection can be more enhanced.

Incidentally, although upon the address's encryption in the above embodiment, each address of the first address area designated by the CPU 11 is converted to its corresponding address of the second address area assigned to the external memory in the predetermined one-to-one correlation and the post-conversion address is set as the scramble address, the present invention is not limited to it and each address may be encrypted using another method.

While the preferred form of the present invention has been described, it is to be understood that modifications will be apparent to those skilled in the art without departing from the spirit of the invention. The scope of the invention is to be determined solely by the following claims.

What is claimed is:

1. An apparatus providing secured information reading from and writing to an external connected memory, comprising:
    a control unit connected to the external memory, the control unit includes:
    a CPU generating an access signal for writing data to or reading data from the external memory,
    an encryption/decryption controller being responsive to the access signal generated for writing to encrypt an address designated by the CPU to generate encrypted write address and encrypted write data, and
    the encryption/decryption controller being responsive to the access signal generated for reading an encrypted address designated by the CPU to generate an encrypted read address and to decrypted the encrypted data read from the external memory to generate plaintext data,
    an external controller configured to write the encrypted data in a position designated by the encrypted write address generated by the encryption/decryption controller and configured to read the encrypted data from a position designated by the encrypted read address generated by the encryption/decryption controller and supplies the same to the encryption/decryption controller for its decryption, and
    an internal bus connecting the CPU, the encryption decryption controller and the external controller and providing a bus for control and data signals,
    wherein upon encryption of data by the encryption/decryption controller, XORing (exclusive-ORing) of plaintext data corresponding to one block and a leading address of the block is computed and ECB mode encryption for each block cipher is effected on the result of computation thereof, and
    wherein upon decryption of data by the encryption/decryption controller, ECB mode decryption for each block cipher is effected on one block of the encrypted data and XORing of the result of decryption thereof and a leading address of the block is computed, thereby obtained plaintext data.

2. The apparatus according to claim 1, wherein the encryption/decryption controller has a key holder for holding each key as data and encrypts the write data for every block using the key to generate the write encrypted data, decrypts the encrypted data read from the external memory for every block using the key and decrypts the same to generate plaintext data.

3. The apparatus according to claim 1, wherein when the designated address for the access signal belongs to a first address area assigned to the external memory, the access signal is supplied to the encryption/decryption controller and when the designated address for the access signal belongs to a second address area assigned thereto separately from the first address area, the access signal is supplied to the external memory without being supplied to the encryption/decryption controller.

4. The apparatus according to claim 1, wherein the external memory includes a non-volatile ROM, wherein, when a data write instruction to the non-volatile ROM is generated by the CPU, the encryption/decryption controller encrypts an address designated by the CPU according to the data write instruction to generate encrypted write address and data, and supplies the encrypted write address and the encrypted data to the CPU, and wherein the CPU supplies the encrypted write address and encrypted data obtained from the encryption/decryption controller to the external control means without using the encryption/decryption controller and allows the external controller to write encrypted data in a position designated by the encrypted write address of the non-volatile ROM.

5. The apparatus according to claim 1, wherein upon encryption of each address by the encryption/decryption controller, the address designated by the CPU is converted to a corresponding one of addresses lying within an address range, which have been assigned to the external memory in a predetermined one-to-on correlation, and the post-conversion address is set as the write address or the read address.

6. The apparatus according to claim 1, wherein the data contains an executable program.

* * * * *